No. 757,014. PATENTED APR. 12, 1904.
O. R. P. BERGLUND & B. O. W. HESSELMAN.
FRICTION GEARING.
APPLICATION FILED DEC. 8, 1903.
NO MODEL.
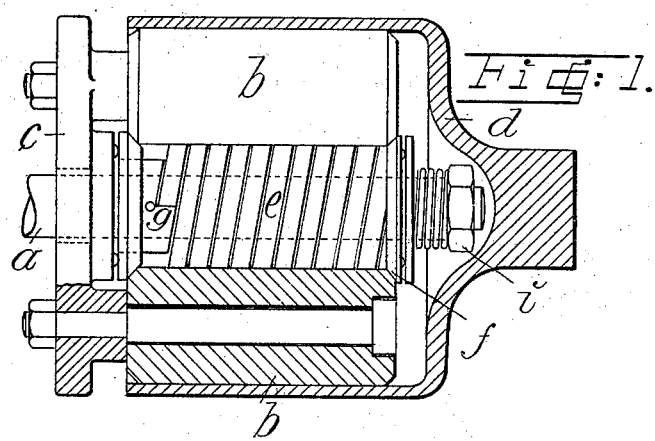
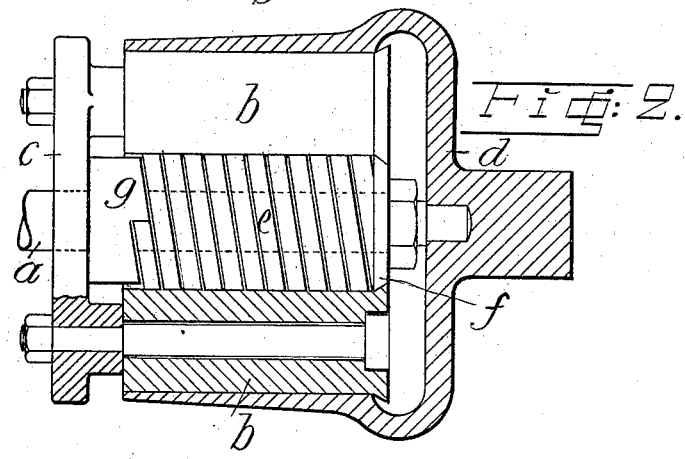
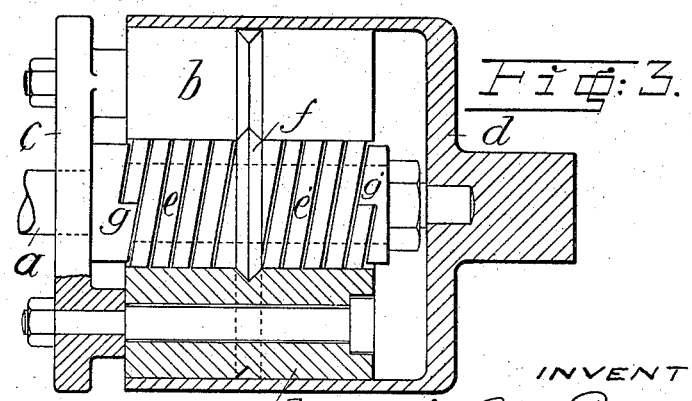
WITNESSES
INVENTORS No. 757,014.

Patented April 12, 1904.

UNITED STATES PATENT OFFICE.

OTTO ROBERT PERCIVAL BERGLUND AND BROR OSKAR WALTER HESSELMAN, OF STOCKHOLM, SWEDEN.

FRICTION-GEARING.

SPECIFICATION forming part of Letters Patent No. 757,014, dated April 12, 1904.

Application filed December 8, 1903. Serial No. 184,322. (No model.)

*To all whom it may concern:*

Be it known that we, OTTO ROBERT PERCIVAL BERGLUND and BROR OSKAR WALTER HESSELMAN, subjects of the King of Sweden and Norway, and residents of Kocksgatan 37, Stockholm, in the Kingdom of Sweden, have invented certain new and useful Improvements in Friction-Gearing, of which the following is a specification.

The present invention relates to an elastic friction-gearing of the kind composed of a number of friction-wheels revolubly mounted on a support and arranged between a quickly-rotating shaft and a surrounding sleeve attached to the part to which motion is to be transmitted from the shaft.

The object of the invention is to so construct such friction-gearing as to cause the friction-wheels to press with greater force against the sleeve accordingly as the force to be transmitted is greater, a firm engagement of the parts being thus obtained.

In the accompanying drawings, a friction-gear constructed according to our said invention is illustrated in a longitudinal section in Figure 1. Figs. 2 and 3 illustrate modified forms in longitudinal section.

$a$ is the quickly-rotating shaft. $b\ b$ are the friction-wheels; $c$, their support, (the wheels $b\ b$ fitting loosely on studs on the said support,) and $d$ is a sleeve on the shaft to which motion is to be transmitted. According to the present invention a spiral spring $e$ is arranged around the shaft $a$, said spring bearing at one end against a projection or lug $g$ on the shaft $a$ and with its circumference against the friction-wheels, while its other end is free on the shaft and either connected with or formed into a ring or collar $f$, loosely mounted on the shaft $a$, and provided with a beveled circumference which bears on the correspondingly-shaped edges of the friction-wheels $b$.

When the shaft $a$ rotates in one direction, it will carry with it the end of the spring bearing on the lug $g$, while the other end experiences a resistance due to the friction of the collar $f$ against the wheels $b$. The spring consequently expands and is pressed the more forcibly against the friction-wheels the greater the force transmitted from the shaft and the wheels $b$ being meanwhile pressed the more tightly against the sleeve $d$. As the spring expands during the rotation of the shaft it strives to move the friction-wheels toward the free end of the spring, the tapering edges of the wheels being as a result pressed the more forcibly against the edge of the ring or collar $f$, thus counteracting the movement of this end of the spring $e$. The ring or collar $f$ is kept pressed, by means of a nut $i$, against the ends of the friction-wheels.

If the spring be wound as shown in Fig. 2—that is, in the opposite direction to that shown in Fig. 1—the wheels $b$ during the motion will be shifted from the free spring end, and for that reason the edges of both the wheels and of the collar or ring $f$ should in this case be made tapering in opposite direction to those shown in Fig. 1. It is also possible, as shown in Fig. 3, to use two springs $e\ e'$, attached at their inner ends to a ring or collar $f$, placed between them and provided with circumferential edges tapering toward the sides and corresponding to similarly-shaped grooves on the friction-wheels $b$. Each spring $e\ e'$ here should be arranged with its outer end in the path of a lug $g\ g'$, respectively, on the shaft $a$, so that one or the other of the springs will be brought into action according to the direction of rotation of the shaft.

In place of transmitting the motion from the shaft $a$ to the sleeve $d$ it is evidently possible to make said sleeve stationary, in which case the motion is transmitted to the support $c$ for the friction-wheels.

Having now particularly described and ascertained the nature of our said invention and in what manner the same is to be performed, we declare that what we claim is—

1. In friction-gearings the combination of a rotating shaft, friction-wheels having each a beveled portion and arranged around the shaft on a support, a sleeve surrounding the friction-wheels, and a spiral spring between the shaft and friction-wheels, said spring surrounding the shaft and being actuated by it at one end but free from it at the other end and a ring or collar, having a conical portion and connected to the free end of the spring and bearing against the correspondingly-shaped portion of the friction-wheels.

2. In friction-gearings the combination of grooved friction-wheels, arranged on a support, a shaft between them, a sleeve surrounding the friction-wheels, and two spiral springs surrounding the shaft and being actuated at one end by the shaft, but free from it at the other end and a ring, conical in cross-section, surrounding the shaft and connected to the free ends of the spring, said ring being adapted to engage with the grooves in the friction-wheels.

In witness whereof we have hereunto set our hands in presence of two witness.

OTTO ROBERT PERCIVAL BERGLUND.
BROR OSKAR WALTER HESSELMAN.

Witnesses:
H. TELANDER,
J. H. MARKMAN.